United States Patent
Chiu et al.

(10) Patent No.: US 12,516,813 B2
(45) Date of Patent: Jan. 6, 2026

(54) COMBUSTION METHOD FOR CONTROLLING AND MONITORING EXHAUST GAS EMISSIONS IN BOILERS

(71) Applicant: Oriental Giant Dyes & Chemical Ind. Corp., Taipei (TW)

(72) Inventors: Teng-sung Chiu, Taipei (TW); Wen-chen Hung, Taipei (TW); Sheng-hsin Huang, Taipei (TW)

(73) Assignee: Oriental Giant Dyes & Chemical Ind. Corp., Taipei (TW)

( * ) Notice: Subject to any disclaimer, the term of this patent is extended or adjusted under 35 U.S.C. 154(b) by 370 days.

(21) Appl. No.: 18/210,118

(22) Filed: Jun. 15, 2023

(65) Prior Publication Data

US 2024/0288165 A1    Aug. 29, 2024

(30) Foreign Application Priority Data

Feb. 24, 2023  (TW) .................................. 112107121

(51) Int. Cl.
*F23N 5/00* (2006.01)
*F23L 7/00* (2006.01)

(52) U.S. Cl.
CPC .............. *F23N 5/003* (2013.01); *F23L 7/005* (2013.01); *F23N 2225/10* (2020.01); *F23N 2900/05001* (2013.01); *F23N 2900/05003* (2013.01)

(58) Field of Classification Search
CPC ................. F23N 5/003; F23N 2225/10; F23N 2900/05001; F23N 2900/05003; F23L 7/005

(Continued)

(56) References Cited

U.S. PATENT DOCUMENTS

| | | | | |
|---|---|---|---|---|
| 4,375,950 A | * | 3/1983 | Durley, III | .............. F23N 1/022 |
| | | | | 431/12 |
| 4,380,146 A | * | 4/1983 | Yannone | .................. F02C 9/00 |
| | | | | 60/790 |

(Continued)

FOREIGN PATENT DOCUMENTS

| CN | 108561869 | 9/2018 |
|---|---|---|
| GB | 2576044 | 2/2020 |

(Continued)

OTHER PUBLICATIONS

European Search Report and the European Search Opinion Dated Dec. 21, 2023 From the European Patent Office Re. Application No. 23180482.4. (8 Pages).

(Continued)

*Primary Examiner* — Vivek K Shirsat

(57) ABSTRACT

A combustion method for controlling and monitoring exhaust gas emissions in boilers is provided. The combustion method comprises the following steps: providing a liquid fuel in a boiler, burning the liquid fuel under atmospheric pressure; measuring a first combustion temperature in the boiler, and monitoring an initial concentration of a first exhaust gas in the boiler; adding a combustion improver to the boiler in batches and monitoring an emission concentration of the first exhaust gas in the boiler, wherein the emission concentration is less than the initial concentration; and repeating the above steps, and monitoring the boiler until a second combustion gas is generated, stop adding the combustion improver, and measuring the temperature in the boiler as a second combustion temperature, and reducing the amount of the combustion improver to avoid the generation of the second exhaust gas.

10 Claims, 2 Drawing Sheets

(58) Field of Classification Search
USPC .......................................................... 431/76
See application file for complete search history.

(56) References Cited

U.S. PATENT DOCUMENTS

| | | | | |
|---|---|---|---|---|
| 4,627,388 A * | 12/1986 | Buice | ..................... | F22B 7/12 |
| | | | | 588/900 |
| 5,790,420 A * | 8/1998 | Lang | ..................... | F23N 5/18 |
| | | | | 73/23.31 |
| 6,714,877 B1 * | 3/2004 | Lang | ..................... | F23N 1/002 |
| | | | | 700/274 |
| 2002/0192609 A1 | 12/2002 | Havlena | | |
| 2004/0128111 A1 * | 7/2004 | Lang | ..................... | F23N 1/002 |
| | | | | 702/188 |
| 2007/0156288 A1 * | 7/2007 | Wroblewski | ......... | G05B 13/042 |
| | | | | 700/266 |
| 2007/0250216 A1 * | 10/2007 | Wintrich | ................ | F23N 5/082 |
| | | | | 700/274 |
| 2010/0267144 A1 * | 10/2010 | Burg | ..................... | A23B 7/148 |
| | | | | 435/410 |
| 2011/0104624 A1 * | 5/2011 | Terushita | ................ | F23L 7/007 |
| | | | | 431/12 |
| 2011/0297061 A1 * | 12/2011 | Magaldi | ..................... | F23J 1/02 |
| | | | | 110/165 R |
| 2017/0107478 A1 * | 4/2017 | Harmon | ................. | C12M 23/44 |
| 2022/0057084 A1 * | 2/2022 | Jerez | ....................... | F23L 7/007 |
| 2025/0102143 A1 * | 3/2025 | Storslett | ................. | F23N 3/002 |

FOREIGN PATENT DOCUMENTS

| | | |
|---|---|---|
| JP | 61-240009 | 10/1986 |
| JP | 62-186108 | 8/1987 |
| JP | 2003-240220 | 8/2003 |
| JP | 2006-046765 | 2/2006 |
| JP | 2007-139266 | 6/2007 |
| TW | 202122947 | 6/2021 |
| TW | I779813 | 10/2022 |
| WO | WO 2009/110035 | 9/2009 |

OTHER PUBLICATIONS

Decision to Grant Dated Oct. 22, 2024 From the Japan Patent Office Re. Application No. 2023-094524. (3 Pages).

Notice of Reasons for Refusal Dated Jul. 20, 2024 From the Japan Patent Office Re. Application No. 2023-094524. (5 Pages).

* cited by examiner

COMBUSTION METHOD FOR CONTROLLING AND MONITORING EXHAUST GAS EMISSIONS IN BOILERS

FIELD OF INVENTION

This disclosure relates to a field of boiler combustion technology, and more particularly, to a combustion method for controlling and monitoring exhaust gas emissions in boilers.

BACKGROUND OF INVENTION

The boiler mainly converts the chemical energy in the fuel into thermal energy stably and continuously through the process of burning the fuel, and uses this thermal energy to heat water or heat medium as a heat source for drying or heating, or a power source.

However, although the use of boilers brings convenience to factory operations, it is also accompanied by environmental issues. For example, the exhaust gases such as sulfur oxide (SOx), nitrogen oxide (NOx), carbon monoxide (CO) and carbon dioxide (CO2) emitted from the boiler during the combustion of the fuel cause serious environmental pollution, increase the greenhouse effect and lead to global warming. Moreover, the particulate matters (PM2.5) produced after combustion degrade the air quality and endanger human health. The earliest solution is to dispose a cloth bag to the exhaust outlet to absorb the particles and exhaust gas emitted after combustion as much as possible. However, under the requirements of environmental protection, the emission requirements of nitrogen oxides are becoming more and more stringent, and such method of using cloth bags to absorb exhaust gas can no longer meet the current environmental protection regulations.

Therefore, it is imperative to develop combustion methods that comply with environmental regulations and have lower exhaust emissions.

SUMMARY OF INVENTION

In view of this, the disclosure provides a combustion method for controlling and monitoring exhaust emissions in boilers. The inventor of this disclosure found that by gradually introducing combustion improver into the boiler (such as reducing the temperature inside the boiler by 25° C. as a stage interval), the flue gas generated by the combustion of the boiler can be gradually reduced. That is, the NOx concentration is reduced, and the production of carbon monoxide (CO) can be simultaneously avoided by controlling the amount of combustion improver added to the boiler In order to solve the above problems, the disclosure provides a combustion method for controlling and monitoring exhaust gas emissions in a boiler. The method comprises the following steps:

- a step S10: providing a liquid fuel in a boiler, burning the liquid fuel under atmospheric pressure to make the steam pressure of the boiler reaches 3 Kg/cm$^2$;
- a step S20: measuring a first combustion temperature in the boiler, and monitoring an initial concentration of a first exhaust gas in the boiler;
- a step S30: adding a combustion improver to the boiler in batches, and monitoring an emission concentration of the first exhaust gas in the boiler, maintaining the steam pressure of the boiler at 3-5 Kg/cm$^2$, wherein the emission concentration is less than the initial concentration; and
- a step S40: repeating the step S20 to the step S30, and monitoring the boiler until a second exhaust gas is generated, stop adding the combustion improver, and measuring the temperature inside the boiler as a second combustion temperature, and reducing the rate of adding of the combustion improver to a critical rate to prevent the generation of the second exhaust gas.

In an embodiment of the disclosure, the combustion improver is water vapor.

In an embodiment of the disclosure, the liquid fuel is provided at a rate between 100-120 liters/hour, the combustion improver is provided at the critical rate greater than or equal to 20 kg/hour and less than 40 kg/hour.

In an embodiment of the disclosure, the step of adding the combustion improver to the boiler in batches in the step S30 further comprises adding the combustion improver in batches at a stage interval of 25° C., and simultaneously measuring the first combustion temperature and the corresponding concentration of the first exhaust gas.

In an embodiment of the disclosure, in the step S40, after stopping adding the combustion improver, the method further comprises repeating the step S20 to the step S30 to maintain the temperature inside the boiler between the first combustion temperature and the second combustion temperature.

In an embodiment of the disclosure, the first combustion temperature ranges from 530° C. to 634° C.

In an embodiment of the disclosure, the second combustion temperature is less than 530° C.

In an embodiment of the disclosure, the liquid fuel is low sulfur fuel oil.

In an embodiment of the disclosure, the low sulfur fuel oil is a fuel oil containing palm oil.

In an embodiment of the disclosure, the first exhaust gas is nitrogen oxides (NOx), and the second exhaust gas is carbon monoxide (CO).

The disclosure provides a combustion method for controlling and monitoring exhaust gas emissions in a boiler. The combustion improver is added to the boiler in batches, and the relationship between the data of the amount of combustion improver added, the temperature in the boiler and the exhaust gas emission is monitored. The benefit effects of the disclosure are that the addition of the combustion improver does gradually reduce the flue gas produced by boiler combustion, and the concentration of NOx emitted can be reduced. Besides, the amount of combustion improver added to the boiler can be controlled to prevent generation of carbon monoxide (CO). That is, when carbon monoxide (CO) is generated in the boiler, the amount of combustion improver introduced into the boiler is reduced to avoid the generation of carbon monoxide (CO).

DESCRIPTION OF DRAWINGS

In order to more clearly illustrate the embodiments of the disclosure or the technical solutions in the prior art, the following briefly introduces the accompanying drawings used in the embodiments. Obviously, the drawings in the following description merely show some of the embodiments of the disclosure. As regards one of ordinary skill in the art, other drawings can be obtained in accordance with these accompanying drawings without making creative efforts.

DETAILED DESCRIPTION OF PREFERRED EMBODIMENTS

The technical solutions in the embodiments of the disclosure will be described clearly and completely below with reference to the drawings in the embodiments of the disclosure. Obviously, the described embodiments are only a part of the embodiments of the disclosure, but not all the embodiments. Based on the embodiments in the disclosure, all other embodiments obtained by those skilled in the art without creative efforts fall within the scope of the disclosure.

Figure 1:
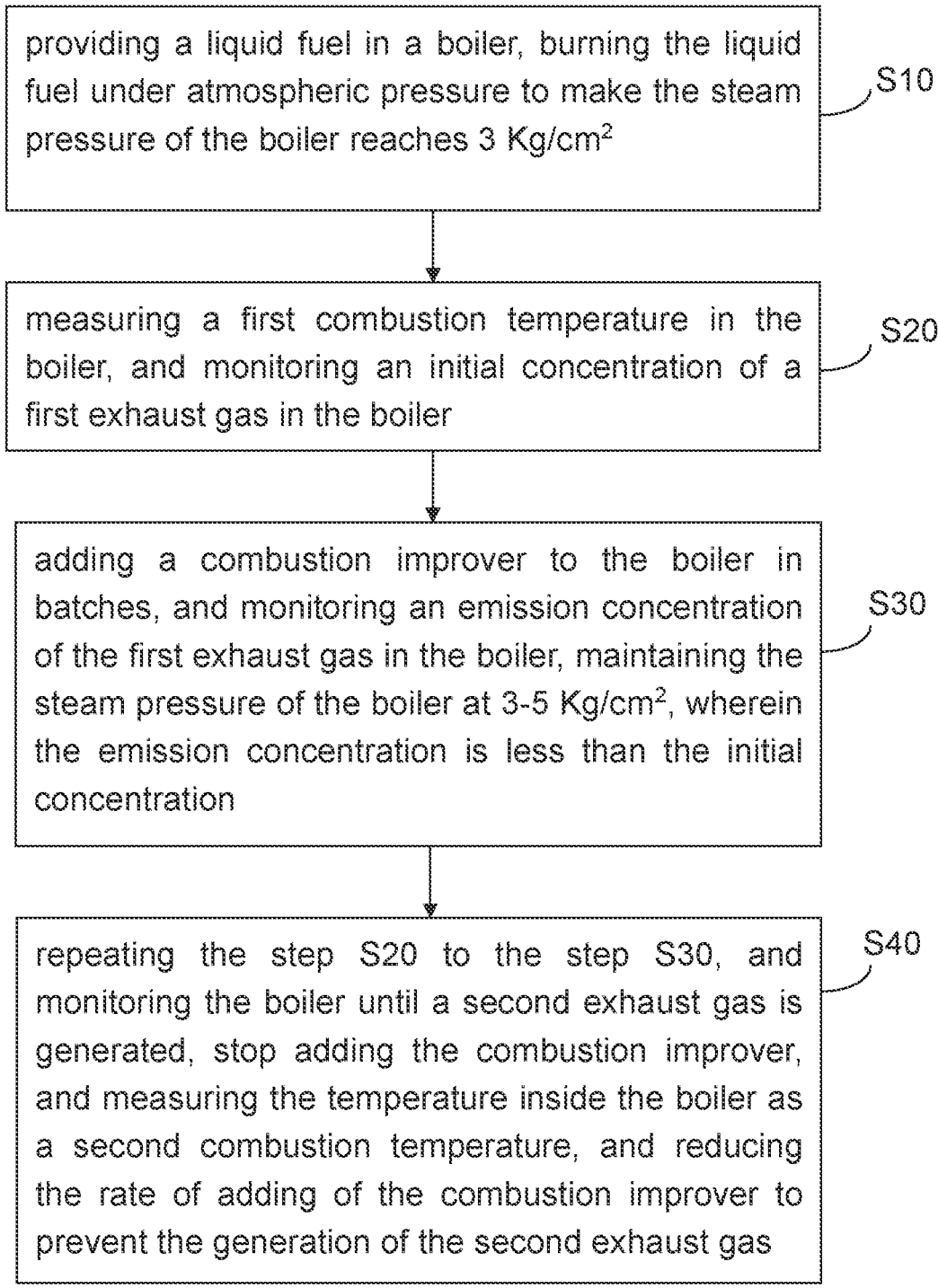
FIG. 1 is a flowchart of combustion method for controlling and monitoring exhaust gas emissions in a boiler according to an embodiment of the disclosure.

Referring to FIG. 1, a flowchart of combustion method for controlling and monitoring exhaust gas emissions in a boiler according to an embodiment of the disclosure is shown. As shown in FIG. 1, the combustion method of the disclosure is suitable for combustion in the boiler, the combustion method comprises the following steps.

In a step S10, a liquid fuel is provided in a boiler, and the liquid fuel is burned under atmospheric pressure to make the steam pressure of the boiler reaches 3 Kg/cm$^2$.

In a step S20, a first combustion temperature in the boiler is measured, and an initial concentration of a first exhaust gas in the boiler is monitored.

In a step S30, a combustion improver is added to the boiler in batches, an emission concentration of the first exhaust gas in the boiler is monitored, and the steam pressure of the boiler at 3-5 Kg/cm$^2$ is maintained. The emission concentration is less than the initial concentration.

In a step S40, the step S20 to the step S30 is repeated. The gas emission from the boiler is monitored until a second exhaust gas is generated. The combustion improver is stopped adding. The temperature inside the boiler is measured as a second combustion temperature, and the rate of adding of the combustion improver is reduced to a critical rate to prevent the generation of the second exhaust gas.

In one embodiment of the disclosure, the liquid fuel of the disclosure is low-sulfur fuel oil, and the combustion improver is water vapor. Preferably, the low-sulfur fuel oil is fuel oil containing vegetable oil such as palm oil.

In different embodiments, the boiler is heated with a medium at a steam pressure between 3-5 Kg/cm$^2$ and the exhaust gas emissions from the boiler are measured. In one embodiment, the medium is water.

In one embodiment of the disclosure, in the step S10, the liquid fuel is provided at a rate between 100-120 liters/hour. In the step S30, the combustion improver is provided at the critical rate greater than or equal to 20 kg/hour and less than 40 kg/hour. That is, the aforementioned rate is the critical rate, and the rate of adding the combustion improver is controlled within the range of the critical rate to avoid the generation of the second exhaust gas, which will be further described below.

In an embodiment of the disclosure, the first combustion temperature ranges from 530° C. to 634° C., and the second combustion temperature is less than 530° C.

In one embodiment of the disclosure, the liquid fuel is used for combustion to heat the medium, while the combustion improver is used to reduce the flame temperature inside the boiler, thereby reducing the generation of sulfur oxides (SOx) and nitrogen oxides (NOx) during the combustion process.

Moreover, the step of adding the combustion improver to the boiler in batches in the step S30 further comprises adding the combustion improver in batches at a stage interval of 25° C., and simultaneously measuring the first combustion temperature and the corresponding concentration of the first exhaust gas. For example, referring to the Table 1 below, when the temperature in the boiler is 609° C., the combustion improver is introduced into the boiler at a rate of 20 kg/hour, and when the temperature in the boiler is 584° C., the combustion improver is introduced into the boiler at a rate of 25 kg/hour. Briefly, the addition of combustion improver will cause a decrease in the temperature inside the boiler. After adding the combustion improver, the temperature in the boiler decreasing at an interval of 25° C. (due to the addition of combustion improver) as a default value is detected, the amount of the combustion improver added into the boiler is adjusted correspondingly, and the temperature in the boiler and the corresponding flue gas emitted by the boiler (including nitrogen oxides (NOx) and carbon monoxide (CO)) are monitored. This will be explained in detail in Table 1 below.

TABLE 1

| Temperature (° C.) inside the boiler | Amount of combustion improver added (kg/hour) | Temperature (° C.) inside the boiler after adding combustion improver (° C.) | Emissions of flue gas, such as nitrogen oxides (NOx), carbon monoxide (CO), and sulfur oxides (Sox) | | |
|---|---|---|---|---|---|
| | | | nitrogen oxide (NOx) (P.P.M) | sulfur oxides (Sox) (P.P.M) | carbon monoxide (CO) (P.P.M) |
| 634 | 0 | 634 | 64 | 0 | 0 |
| | 20 | 609 | 52 | 0 | 0 |
| | 25 | 584 | 35 | 0 | 0 |
| | 30 | 559 | 29 | 0 | 0 |
| | 35 | 534 | 25 | 0 | 0 |
| | 38 | 530 | 21 | 0 | 0 |
| | 40 | 529 | 20 | 0 | 5 |

Figure 2:
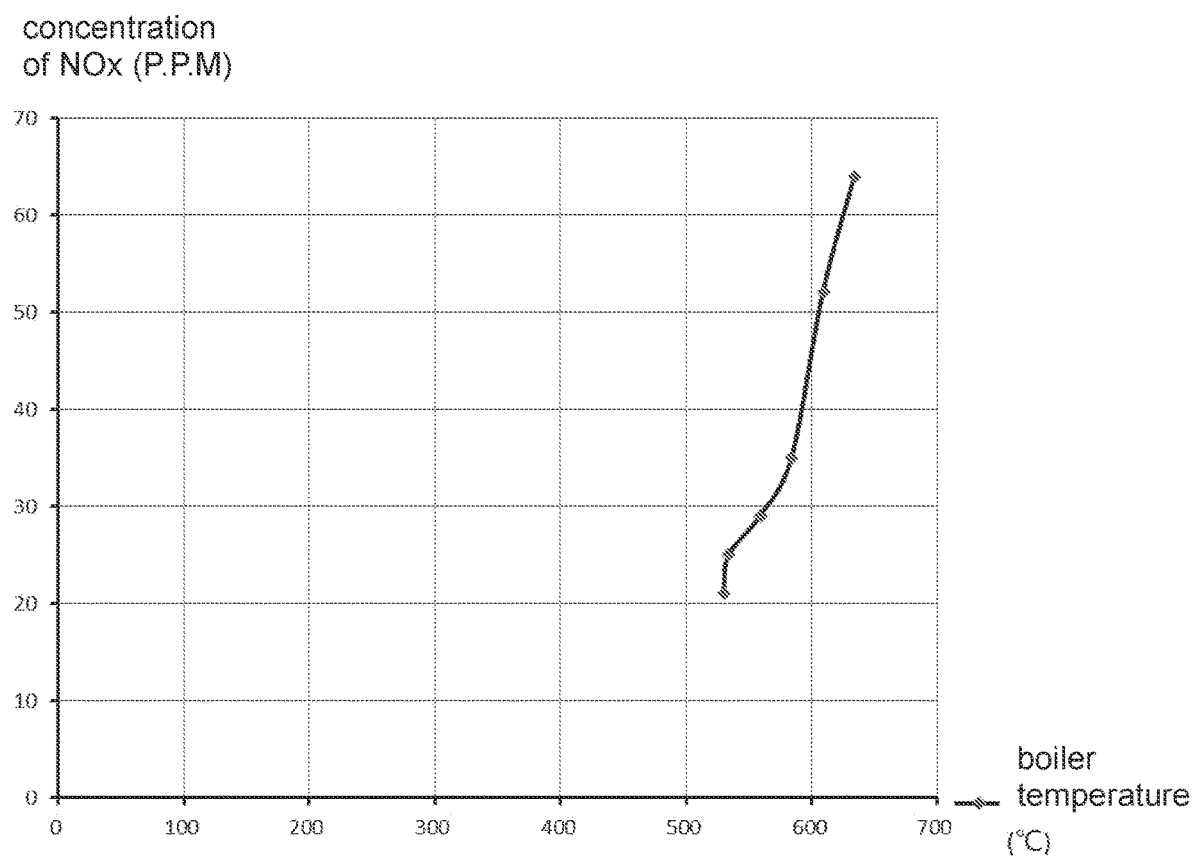
FIG. 2 is a schematic diagram of the corresponding correlation between the boiler temperature and nitrogen oxide (NOx) concentration obtained based on the method of the disclosure.

Referring to FIG. 1 to FIG. 2 and Table 1, in step S10, after the liquid fuel in the boiler starts to burn, the initial temperature (that is, the first combustion temperature) measured in the boiler is 634° C. Before the combustion improver is added, the concentration of the first exhaust gas (i.e., nitrogen oxides (NOx)) is measured to be 64 P.P.M (such as step S20). As the combustion proceeds, as in step S30, the combustion improver is added to the boiler in batches, and the combustion improver is added at a critical rate. In this embodiment, the critical rate is 20 kg/hr, and it can be seen that the concentration of the first exhaust gas (i.e. nitrogen oxides (NOx)) decreases to 52 P.P.M. Then, the combustion improver is added into the boiler in batches and the amount of combustion improver added is increased based on the first combustion temperature decreased into the boiler at an interval of 25° C. It can be seen that for every 25° C. decreased in the first combustion temperature in the boiler, the corresponding nitrogen oxide (NOx) is also decreased, and at the same time, no sulfur oxide (Sox) or carbon monoxide (CO) is produced in the boiler. For example, referring to the Table 1 above, when the temperature inside the boiler is 559° C., the combustion improver is added into the boiler at an rate of 30 kg/hour, and when the temperature inside the boiler is 534° C., the combustion improver is added into the boiler at an rate of 35 kg/hour.

In a preferred embodiment, when the rate (critical rate) of adding the combustion improver reaches 38 kg/hour, the first combustion temperature in the boiler is also gradually reduced to 530° C. The emission of nitrogen oxides (NOx) has decreased from 64 P.P.M. initially to 21 P.P.M., with a reduction of 67%. In this embodiment, the critical rate is to provide the combustion improver at a rate greater than or equal to 20 kg/hour and less than 40 kg/hour. That is, the amount of the combustion improver is controlled to be added to the boiler at an amount greater than or equal to 20 kg/hour but not more than 40 kg/hour.

When the rate of combustion improver added is greater than the critical rate to 40 kg/h, the temperature in the boiler is reduced to 529° C., and the emission of nitrogen oxides (NOx) is decreased to 20 P.P.M. However, it is monitored that the combustion process in the boiler produces a second exhaust gas (that is, carbon monoxide (CO)), and the concentration of the second exhaust gas is 5 P.P.M. Correspondingly, the temperature inside the boiler is the second combustion temperature. Once the second exhaust gas is generated, it means that incomplete combustion occurs in the boiler. It is necessary to temporarily stop adding the combustion improver to make the temperature inside the boiler back to a temperature higher than the second combustion temperature.

Therefore, by controlling the rate of adding the combustion improver into the boiler and monitoring the corresponding temperature in the boiler corresponding to different rate of adding the combustion improver into the boiler, this enables the boiler to achieve an ideal combustion state that minimizes the emission of nitrogen oxides (NOx) and does not accompany the generation of carbon monoxide (CO) and sulfur oxides (Sox).

Referring to Tables 2, 3, and 4, in the following embodiments 1-2, the combustion method of the disclosure, a 6-ton horizontal smoke tube boiler comprising a low-pressure oil pump and a burner is used to burn the fuel oil of embodiments 1-2, The pollutant data in the flue gas that has not been processed by exhaust gas treatment equipment (such as scrubber) is measured through portable detection equipment.

The model of the device being used:
1. 6-ton horizontal smoke tube boiler: manufactured by Longquan Boiler;
2. Oil pump: manufactured by Heyongxing Machinery Factory;
3. Portable detection equipment: produced by KIMO in France (model KGAZ310).

Ingredients in the used fuel composition:
1. Special low sulfur fuel oil: purchased from Taiwan China National Petroleum Corporation Limited; and
2. Industrial low sulfur fuel oil: purchased from Huanyu International Energy Co., Ltd. (oil product number UNI-65527864).

Embodiment 1

In this embodiment, the above-mentioned 6-ton horizontal smoke tube boiler is used to implement the combustion method shown in FIG. 1, and the above-mentioned special low-sulfur fuel oil is provided as the liquid fuel. The liquid fuel is provided at a rate of 110 liters/hour, and the combustion improver is not provided in this embodiment, and the pollutant data in the following Table 2 are measured by the aforementioned portable detection equipment.

TABLE 2

| Pollutant | data |
| --- | --- |
| Sulfur oxide | 19 P.P.M |
| nitrogen oxide | 45 P.P.M |

Embodiment 2

In this embodiment, the above-mentioned 6-ton horizontal smoke tube boiler is used to implement the combustion method shown in FIG. 1, and the above-mentioned special low-sulfur fuel oil is provided as the liquid fuel. The liquid fuel is provided at a rate of 110 liters/hour, and the combustion improver is provided at a rate of 30 kg/hour, and the pollutant data in the following Table 3 are measured by the aforementioned portable detection equipment.

TABLE 3

| Pollutant | data |
| --- | --- |
| Sulfur oxide | 0 P.P.M |
| nitrogen oxide | 30 P.P.M |

Based on the data of exhaust emissions from Tables 2 to 3, it can be seen that the combustion method of the disclosure provides a combustion method suitable for reducing exhaust gas emissions. The effect of the method is to reduce the generation of air pollutants such as sulfur oxides (SOx) and nitrogen oxides (NOx) after combustion. The measured data of sulfur oxides (SOx) and nitrogen oxides (NOx) in exhaust emissions are in comply with the latest boiler pollutant emission standards published by the government's environmental protection department. In this way, the problem of excessive air pollutants and fine suspended particulate matters encountered in the conventional boiler operation method can be solved, and the pollutants such as sulfur oxides (SOx) and nitrogen oxides (NOx) in the exhaust gas after combustion can be reduced.

In addition, the combustion method provided by the disclosure is suitable for use in conventional boilers, it is unnecessary to construct new equipment or transform conventional boilers. It avoids the additional safety problems such as careless use, natural gas leakage, etc. that may be encountered in the construction of new pipelines or storage tanks when the boiler system is changed to a new fuel with low flammable and explosive flash point, such as natural gas. The disclosure provides a safe, convenient, and economical combustion method for factories to reduce exhaust emissions by installing new boilers or using conventional boilers.

As mentioned above, the disclosure provides a combustion method for controlling and monitoring exhaust gas emissions in a boiler. The combustion improver is added to the boiler in batches, and the relationship between the data of the amount of combustion improver added, the temperature in the boiler and the exhaust gas emission is monitored. The addition of the combustion improver does gradually reduce the flue gas produced by boiler combustion, and the concentration of NOx emitted can be reduced. Besides, the amount of combustion improver added to the boiler can be controlled to prevent generation of carbon monoxide (CO). That is, when carbon monoxide (CO) is generated in the boiler, the amount of combustion improver introduced into the boiler is reduced to avoid the generation of carbon monoxide (CO). By controlling the rate of adding the combustion improver into the boiler and monitoring the corresponding temperature in the boiler corresponding to different rate of adding the combustion improver into the boiler, an ideal combustion state can be achieved in the boiler that minimizes the emission of nitrogen oxides (NOX) and is not accompanied by the production of carbon monoxide (CO) and sulfur oxides (Sox).

The description of the above embodiments is only used to understand the method and features of this disclosure. The present disclosure has been described with preferred embodiments thereof and it is understood that many changes and modifications to the described embodiment can be carried out without departing from the scope and the spirit of the invention that is intended to be limited only by the appended claims.

What is claimed is:

1. A combustion method for controlling and monitoring exhaust gas emissions in boilers, comprising the steps of:
   a step S10 of providing a liquid fuel in a boiler, burning the liquid fuel under atmospheric pressure to make a steam pressure in the boiler reach 3 $Kg/cm^2$;
   a step S20 of measuring a first combustion temperature in the boiler, and monitoring an initial concentration of a first exhaust gas in the boiler;
   a step S30 of adding a combustion improver to the boiler in batches, and monitoring an emission concentration of the first exhaust gas in the boiler, maintaining the steam pressure of the boiler at 3-5 $Kg/cm^2$, wherein the emission concentration is less than the initial concentration; and
   a step S40 of repeating the steps S20 to S30, and monitoring the boiler until a second exhaust gas is generated, stopping adding the combustion improver, and measuring the temperature inside the boiler as a second combustion temperature, and reducing the rate of adding of the combustion improver to a critical rate to prevent the generation of the second exhaust gas.

2. The combustion method for controlling and monitoring exhaust gas emissions in boilers according to claim 1, wherein the combustion improver is water vapor.

3. The combustion method for controlling and monitoring exhaust gas emissions in boilers according to claim 1, wherein the liquid fuel is provided at a rate between 100-120 liters/hour, the combustion improver is provided at the critical rate of between 20 kg/hour and up to but not including 40 kg/hour.

4. The combustion method for controlling and monitoring exhaust gas emissions in boilers according to claim 1, wherein the step of adding the combustion improver to the boiler in batches in the step S30 further comprises adding the combustion improver in batches at a stage interval of 25° C., and simultaneously measuring the first combustion temperature and the corresponding concentration of the first exhaust gas.

5. The combustion method for controlling and monitoring exhaust gas emissions in boilers according to claim 1, wherein in the step S40, after stopping adding the combustion improver, the method further comprises repeating the steps S20 step S30 to maintain the temperature inside the boiler between the first combustion temperature and the second combustion temperature.

6. The combustion method for controlling and monitoring exhaust gas emissions in boilers according to claim 1, wherein the first combustion temperature ranges from 530° C. to 634° C.

7. The combustion method for controlling and monitoring exhaust gas emissions in boilers according to claim 1, wherein the second combustion temperature is less than 530° C.

8. The combustion method for controlling and monitoring exhaust gas emissions in boilers according to claim 1, wherein the liquid fuel is low sulfur fuel oil.

9. The combustion method for controlling and monitoring exhaust gas emissions in boilers according to claim 1, wherein the low sulfur fuel oil is a fuel oil containing palm oil.

10. The combustion method for controlling and monitoring exhaust gas emissions in boilers according to claim 1, wherein the first exhaust gas is nitrogen oxides (NOx), and the second exhaust gas is carbon monoxide (CO).

* * * * *